(12) United States Patent
Gupta et al.

(10) Patent No.: US 7,542,470 B2
(45) Date of Patent: Jun. 2, 2009

(54) METHOD AND APPARATUS FOR ROUTING A PACKET WITHIN A PLURALITY OF NODES ARRANGED IN A LINE OR A TREE GIVEN A MAXIMUM STACK DEPTH

(75) Inventors: Anupam Gupta, Pittsburgh, PA (US);
Amit Kumar, Ithaca, NY (US); Rajeev Rastogi, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1126 days.

(21) Appl. No.: 10/404,010

(22) Filed: Mar. 31, 2003

(65) Prior Publication Data

US 2004/0190517 A1    Sep. 30, 2004

(51) Int. Cl.
*H04L 12/56* (2006.01)
(52) U.S. Cl. .................. 370/392; 370/256; 370/408
(58) Field of Classification Search ................ 370/392, 370/400, 401, 409, 256, 252, 408, 389
See application file for complete search history.

(56) References Cited

U.S. PATENT DOCUMENTS

| | | | |
|---|---|---|---|
| 6,856,991 B1 * | 2/2005 | Srivastava ................. 707/10 |
| 6,925,081 B2 * | 8/2005 | Meda ......................... 370/392 |
| 6,950,398 B2 * | 9/2005 | Guo et al. .................. 370/235 |
| 7,120,165 B2 * | 10/2006 | Kasvand-Harris et al. ... 370/466 |
| 2003/0137983 A1 * | 7/2003 | Song ........................ 370/395.4 |
| 2004/0178479 A1 * | 9/2004 | Saito ......................... 257/632 |

OTHER PUBLICATIONS

Gupta et al., "Traveling with a Pez Dispenser (Or, Routing Issues in MPLS)," IEEE Foundations of Computer Science 2001: 148-157 (2001).

* cited by examiner

*Primary Examiner*—Brian D Nguyen

(57) ABSTRACT

A method and apparatus are provided for routing a packet within a plurality of n nodes arranged in a line or tree (or a combination of the foregoing), given a maximum stack depth, s. A fixed stack process for routing packets on a line given a stack depth, s, initially divides a line of n nodes into segments, such as $n^{1/s}$ approximately equal segments. A unique label is assigned to each segment and, within each segment, one of up to $n^{1/s}$ labels is assigned to each node. A fixed stack process for routing packets on a tree, given a target stack depth, s, initially identifies a subset, S, of at nodes from the tree, such as at most 3 $n^{1/s}$ nodes, such that after the subset, S, is removed, each remaining subtree has at most $n^{(s-1)/s}$ nodes. A unique label is assigned to each of the nodes in the subset S and, within each remaining subtree, one of up to $n^{(s-1)/s}$ labels is assigned to each node. If the bound on the stack depth cannot be violated, the fixed stack routing process merges every two consecutive levels in the stack to one level.

18 Claims, 5 Drawing Sheets

| NODE | INCOMING EDGE | INCOMING LABEL | INCOMING EDGE | ACTION |
|---|---|---|---|---|
| 6 | (11, 6), (7, 6) | $L_1$ | (6, 5) | NONE |
| | (5, 6), (11, 6) | $L_2$ | (6, 7) | NONE |
| | (5, 6), (7, 6) | $L_3, L_4$ | (6, 11) | NONE |
| 11 | (6, 11), (12, 11) | $L_3$ | (11, 10) | NONE |
| | (6, 11), (10, 11) | $L_4$ | (11, 12) | NONE |
| | (10, 11), (12, 11) | $L_1, L_2$ | (11, 6) | NONE |

| NODE | INCOMING EDGE | INCOMING LABEL | INCOMING EDGE | ACTION |
|---|---|---|---|---|
| 5 | (1, 5) | * | (5, 6) | NONE |
|  | (6, 5) | * | (5, 1) | NONE |
| 6 | (5, 6) | $L_1$ | (6, 7) | NONE |
|  | (7, 6) | $L_1$ | (6, 5) | NONE |
|  | (5, 6), (7, 6) | $L_2$ | (6, 11) | POP |
|  | (11, 6) | $L_1$ | (6, 5) | NONE |
|  | (11, 6) | $L_2$ | (6, 7) | NONE |
| 7 | (6, 7) | * | (7, 2) | NONE |
|  | (2, 7) | * | (7, 6) | NONE |
| 10 | (10, 11) | * | (3, 10) | NONE |
|  | (3, 10) | * | (10, 11) | NONE |
| 11 | (10, 11) | $L_1$ | (11, 12) | NONE |
|  | (12, 11) | $L_1$ | (11, 10) | NONE |
|  | (10, 11), (12, 11) | $L_2$ | (11, 6) | POP |
|  | (6, 11) | $L_1$ | (11, 10) | NONE |
|  | (6, 11) | $L_2$ | (11, 12) | NONE |
| 12 | (11, 12) | * | (12, 4) | NONE |
|  | (4, 12) | * | (12, 11) | NONE |

*FIG. 8*

METHOD AND APPARATUS FOR ROUTING A PACKET WITHIN A PLURALITY OF NODES ARRANGED IN A LINE OR A TREE GIVEN A MAXIMUM STACK DEPTH

FIELD OF THE INVENTION

The present invention relates to packet routing techniques and, more particularly, to techniques for routing packets across a plurality of nodes arranged in a line or tree (or a combination of the foregoing).

BACKGROUND OF THE INVENTION

In most conventional packet based network routing protocols, a router receives a packet and analyzes the packet header to determine the next hop for the packet between the source and intended destination. These decisions are typically made locally and independently of other routers, based solely on the analysis of the packet header, which contains the destination address. For example, routers using conventional Internet Protocol (IP) forwarding techniques typically look for a "longest prefix" match to the entries in the routing table to determine the next hop. In general, each router must extract the relevant information from the (much longer) packet header. Furthermore, routers are not designed to use information about the source of the packets from these headers for forwarding purposes.

An alternative routing protocol, proposed by the Internet Engineering Task Force (IETF), is referred to as MultiProtocol Label Switching (MPLS). The MPLS routing protocol is described, for example, in Bruce Davie and Yakov Rekhter, MPLS: Technology and Applications, Morgan Kaufmann Publishers (2000); or MPLS Charter, each incorporated by reference herein. The MPLS routing protocol analyzes a packet header just once, and causes the packet to be assigned a stack of labels, where the labels are usually much smaller than the packet headers themselves, as described in Eric C. Rosen et al., "MPLS Label Stack Encoding," RFC 3032, incorporated by reference herein.

At each subsequent hop, the router examines the label at the top of the label stack, and makes the decision for the next hop based solely on that label. The router can then remove this label from the stack, if desired, and push zero or more labels onto the stack, before sending the packet to the next hop. The label replacement and the path followed by the packet are referred to as a Label Switched Path (LSP). It is noted that there is no further analysis of the network layer header by any of the subsequent routers.

There are a number of advantages of the MPLS routing protocol over conventional network layer forwarding, including the above-mentioned elimination of header analysis at each hop. A more significant benefit, however, is that since the header is analyzed and the stack is assigned to the packet when the packet enters the network, the ingress router may use any additional information about the packet to route packets differently to satisfy different quality of service (QoS) requirements. For example, data for time-sensitive applications may be sent along faster but more expensive Label Switched Paths than regular data. Also, the ingress router can encode information about the source as well as the destination in the labels, which cannot be done with conventional forwarding. In addition, traffic engineering is easier relative to conventional routing schemes, since the entire route taken by the packet can be specified very naturally on the stack. Thus, MPLS has become a popular packet routing protocol.

Nonetheless, little is known about the performance that can be achieved with MPLS, and about the intrinsic trade-offs in the use of resources under the MPLS protocol. It has been observed that a good routing protocol is one that uses a minimum possible set of labels (to enhance router performance), while pushing the minimum possible number of labels on the stack for each packet (to keep the packet sizes small). Unfortunately, there is a trade-off involved here, and the two goals of minimizing label sizes and minimizing stack depths are conflicting. A need therefore exists for a method and apparatus for determining the depth of the stack required for routing packets in an n-node network, and the interaction of such stack depth with label size. A further need exists for protocols for determining the stack depth and label size required for routing packets in an n-node network that strike a balance between smaller labels and smaller stacks.

SUMMARY OF THE INVENTION

A method and apparatus are provided for routing a packet within a plurality of n nodes arranged in a line or tree (or a combination of the foregoing), given a maximum stack depth, s. Given a bound on the stack depth, the present invention provides a routing protocol that minimizes the number of labels used.

A fixed stack process for designing a protocol to route packets on a line initially divides a line of n nodes into segments, such as $n^{1/s}$ approximately equal segments. A unique label is assigned to each segment and, within each segment, one of up to $n^{1/s}$ labels is assigned to each node. Thus, when a packet is routed, the appropriate segment is identified based on the unique label and a node within the identified segment is identified based on the one of up to $n^{1/s}$ labels. When the stack depth, s, is equal to two, for example, a first stack level identifies one of the path segments and a second stack level identifies a node within the identified path segment. The disclosed fixed stack routing protocol for routing on a line with a maximum stack depth of s uses only $sn^{1/s}$ labels, which is quite close to the information theoretic bound of $n^{1/s}$.

The disclosed fixed stack routing process provides two techniques for designing a protocol for routing on a tree, T, of nodes, given a target stack depth, s. First, a protocol is provided that, given a target stack depth s, uses only $O(\Delta + sn^{1/s})$ labels (but violates the bound on the stack depth by a factor of two). If the bound on the stack depth cannot be violated, however, the fixed stack routing process can provide a protocol to route on a tree with $\Delta sn^{1/s}$ labels. When the stack depth is bounded by two, for example, the fixed stack routing process can provide a routing protocol that requires up to $\Omega(n^{2/3})$ labels.

The exemplary fixed stack process for designing a protocol to route packets on a tree, T, of nodes initially identifies a subset, S, of nodes from the tree T, such as at most $3 n^{1/s}$ nodes, such that after the subset, S, of nodes is removed, each remaining subtree has less than a maximum number of nodes, such as at most $n^{(s-1)/s}$ nodes. Thereafter, a unique label is assigned to each of the nodes in the subset S and, within each remaining subtree, one of up to $n^{(s-1)/s}$ labels is assigned to each node. Finally, if the bound, s, on the stack depth cannot be violated, then every two consecutive levels in the stack are merged to one level.

When a packet is routed within the tree, T, the stack is first processed to identify a node v in the subset, S, using the unique label. Thereafter, an edge incident with node v is identified leading to the appropriate subtree, and a node within the subtree associated with the edge is identified based on one of up to $n^{(s-1)/s}$ labels. When the stack depth, s, is equal to three, for example, a first stack level identifies a node v in the subset, S, a second stack level identifies an edge incident with node v to take and a third stack level identifies a node with the corresponding subtree.

A more complete understanding of the present invention, as well as further features and advantages of the present invention, will be obtained by reference to the following detailed description and drawings.

DETAILED DESCRIPTION

It is known to employ label stacks to dramatically reduce the number of labels required for setting up MPLS Label Switched Paths in a network. There are a number of scalability and performance related reasons for reducing the size of the label space. First, there is a growing interest among service providers to use MPLS for providing Virtual Private Network (VPN) services. Offering these MPLS-based VPN services to thousands of customers would require the service provider to set up and manage thousands of MPLS Label Switched Paths connecting the VPN endpoints (especially for Layer 2 MPLS VPNs and VPN services based on the overlay model).

Only 20 bits of each 32-bit label stack entry are generally available for encoding the label. Thus, the label space cannot exceed $2^{20}$. Therefore, to maintain scalability, the label space must be conserved to the greatest extent possible. In addition, a small label space reduces the size of the forwarding table used by each label switching router to make label replacement and forwarding decisions for each incoming label. A smaller forwarding table helps to lower memory requirements at routers and also enables them to switch packets faster.

Based on the foregoing, smaller label sizes are critical for achieving better scalability and performance. However, smaller label sizes are obtained at the expense of deeper stacks. Deep stacks are undesirable since each stack entry is 32 bits, and longer stacks increase the space requirements in IP packet headers. Thus, the two goals of smaller labels and smaller stacks oppose each other, and the trade-offs involved are non-trivial. The protocols for routing a set of MPLS Label Switched Paths disclosed herein provide a balance between smaller labels and smaller stacks.

It is again noted that routers can only look at the top of the stack to decide the next hop (as well as the set of labels to push on the stack). Furthermore, routers maintain a distinct label switching forwarding table for each interface, and thus the next hop decision is made based on the incoming edge on which the packet was received and the label on the top of the stack.

VPN Provisioning in the Hose Model

The trade-off between label size and stack depth is illustrated using a single MPLS VPN based on the hose model. See, for example, A. Gupta et al., "Provisioning a Virtual Private Network: A Network Design Problem For Multicommodity Flow," Proc. of the 33 d ACM Symposium on Theory of Computing (2001); or A. Kumar et al., "Algorithms for Provisioning Virtual Private Networks In The Hose Model," Proc. ACM SIGCOMM (2001). Generally, in the hose model, each VPN endpoint specifies a pair of bandwidths—an ingress bandwidth and an egress bandwidth. The ingress bandwidth for an endpoint specifies the maximum incoming traffic from all the other VPN endpoints into the endpoint, while the egress bandwidth is the maximum amount of traffic the endpoint can send to the other VPN endpoints. In has been shown that using a tree structure to connect VPN endpoints results in efficient utilization of network bandwidth, since it enables bandwidth to be shared between VPN end-points. Algorithms have been proposed for computing VPN trees that minimize the reserved bandwidth. MPLS has been proposed to be used to set up Label Switched Paths between each pair of VPN endpoints along edges of the VPN tree. Further, since the paths connecting a pair of endpoints in the tree may not correspond to the shortest path between the endpoints, path setup will need to rely on the explicit routing capabilities of either RSVP-TE or CR-LDP.

Figure 1A:
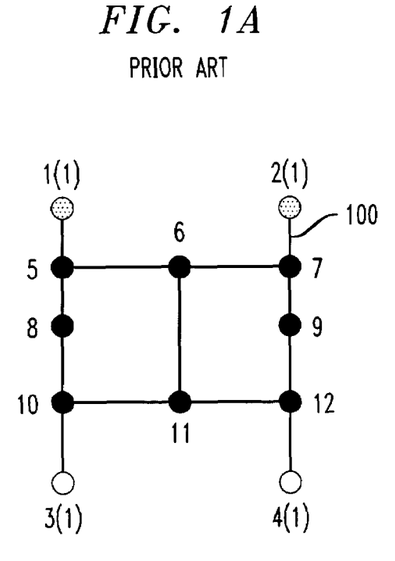
FIGS. 1A and 1B illustrate a conventional approach for routing packets along paths in a virtual private network using the MPLS routing protocol.
Figure 1B:
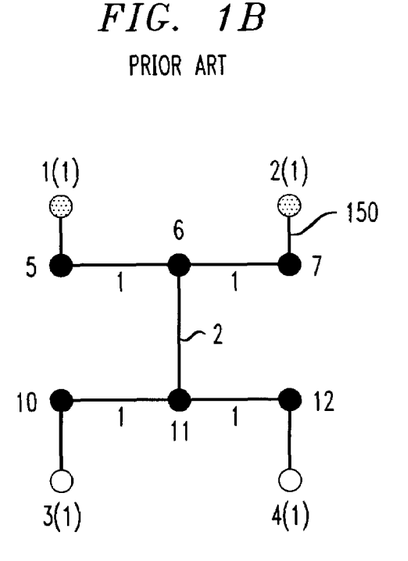

FIGS. 1A and 1B illustrate the conventional routing of packets along paths in a VPN tree using MPLS. FIG. 1A illustrates a network graph 100, where four VPN endpoints 1, 2, 3, 4 are shown, and each VPN endpoint 1, 2, 3, 4 has equal ingress and egress bandwidths of one. FIG. 1B illustrates an optimal VPN tree 150 connecting the four endpoints and the bandwidth reserved on each edge of the tree. For instance, two units of bandwidth must be reserved in each direction on edge (6; 11), since the combined bandwidth requirement for endpoints 1 and 2 is two, and the combined bandwidth for endpoints 3 and 4 is also two. Note that the path connecting endpoints 2 and 4 in the tree is not the shortest path between them (the shortest path between endpoints 2 and 4 consists of the following four edges: (4; 12); (12; 9); (9; 7); (7; 2)). The same holds for VPN endpoints 1 and 3.

The problem is to develop MPLS routing protocols for establishing the Label Switched Paths or routing paths (along edges of the VPN tree 150 in FIG. 1B) between each pair of VPN endpoints, and that use the minimum number of labels. In order to devise a MPLS routing protocol for the routing paths with a stack depth of only one, four labels are required, one label $L_i$ for each VPN endpoint i. Further, every network node simply forwards each incoming packet with label $L_i$ along the outgoing edge in the direction of endpoint i (without popping the label). For example, when node 6 in FIG. 1B encounters a packet with either label $L_3$ or $L_4$, node 6 forwards the packet with the same label ($L_3$ or $L_4$) along edge (6;

11). Similarly, packets with labels $L_1$ and $L_2$ are forwarded by node 6 along edges (6; 5) and (6; 7), respectively.

Figure 2:
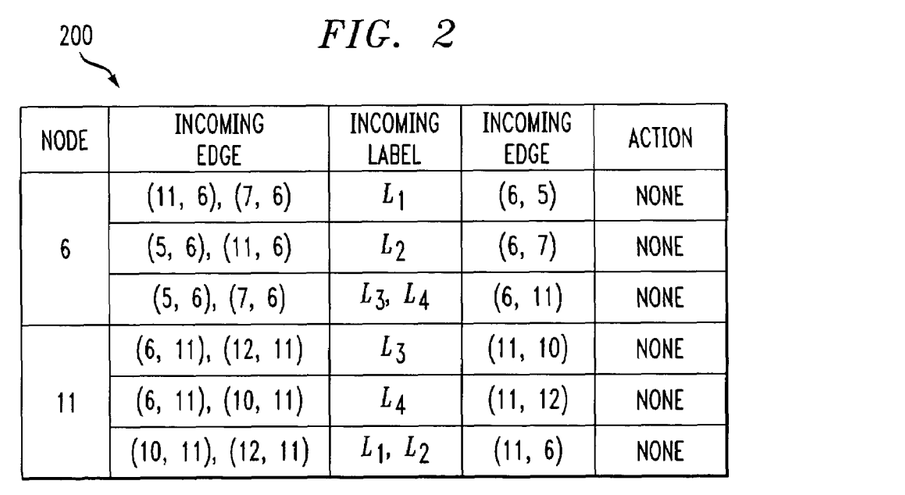
FIG. 2 is a sample table depicting actions and outgoing edges for packets depending on the incoming edge and label, with a stack depth of one, for nodes 6 and 11 of FIGS. 1A and 1B.

FIG. 2 is a table 200 depicting, for nodes 6 and 11 of FIGS. 1A and 1B, the actions and outgoing edges for packets depending on the incoming edge and label, with a stack depth of one. As observed from FIG. 2, an endpoint i can send a packet to endpoint j by pushing a single label $L_j$ onto the stack. Thus, to implement the routing paths between VPN endpoints with a stack depth of one, four labels are required with one label per endpoint.

Figure 3:
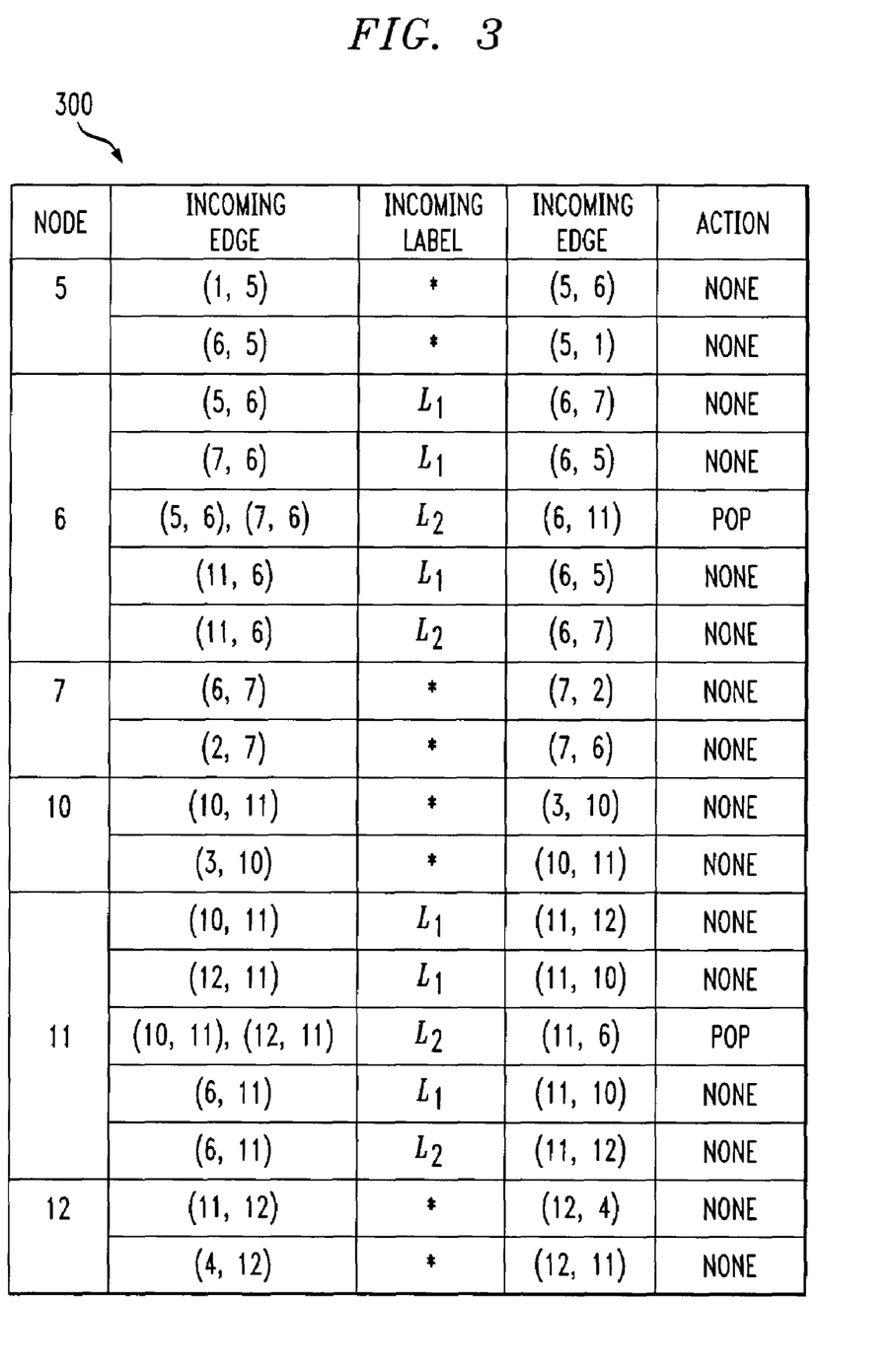
FIG. 3 is a sample table depicting actions and outgoing edges for packets depending on the incoming edge and label, with a stack depth of two, for nodes 5 through 7 and 10 through 12 of FIGS. 1A and 1B.

FIG. 3 is a table 300 depicting, for nodes 5-7 and 10-12 of FIGS. 1A and 1B, the actions and outgoing edges for packets depending on the incoming edge and label, with a stack depth of two. By increasing the stack depth to two, all routing paths can be implemented with only two labels $L_1$ and $L_2$. Consider the routing protocol contained in the table shown in FIG. 3, and consisting, for all nodes, of the outgoing edge and stack-related actions for packets. It is noted that an asterisk in FIG. 3 denotes a wild card entry that matches any label. With the above routing protocol, it is possible for every pair of VPN endpoints to communicate with a maximum stack depth of two. For instance, to send a packet to endpoint 2, endpoint 1 simply pushes a single label $L_1$ onto the stack—the routing protocol specifies that a packet with label $L_1$ and entering nodes 5, 6 and 7 along edges (1; 5), (5; 6) and (6; 7), respectively, is forwarded along the edges (5; 6), (6; 7) and (7; 2), respectively. Similarly, endpoint 1 can send a packet to endpoint 4 by pushing label $L_2$ onto the stack twice. In this case, node 6, when it receives the packet on edge (5; 6), pops the topmost label $L_2$ and forwards the packet along edge (6; 11), and node 11, on seeing the second label $L_2$ at the top of a packet arriving on edge (6; 11), forwards the packet toward endpoint 4 along edge (11; 12). Thus, for the example tree in FIG. 1B, it follows that increasing the stack depth from one to two causes a reduction in the label size from four to two, when implementing all the routing paths for the tree.

System Model

Each packet carries a stack of labels. The labels are drawn from a set $\Sigma$ of size L, which is identified with the set $\{1, 2, \ldots, L\}$. The network is a undirected graph G equal to (V, E), where each node is a router and runs a routing protocol. When a packet reaches a router v on edge e equal to $\{u, v\}$, the router pops and examines the top of the stack. (If the stack is empty, the packet should be destined for v.) The protocol at vertex v is a function $f$:

$$E_v \times \Sigma \to (E_v \times \Sigma^*),$$

where $E_v$ is the set of edges incident to v. If f(e, top(Stack))= (e', $\sigma$), the router pushes the string $\sigma$ on the stack, and then sends the packet along edge e'.

It is noted that there is no bound on the number of labels that can be pushed on and hence, for ease of exposition, the top of the stack is popped off when reaching a router. The quantity of interest is the maximum stack depth required for routing between any two vertices, denoted by s. An (L, s) protocol is one which uses on the order of L labels, referred to as O(L) labels, and has a maximum stack depth O(s).

According to one aspect of the present invention, a routing protocol is provided for sending packets between a set of n nodes along a specified set of routing paths, one for each pair of nodes. The present invention considers routing paths that may be a line or a tree. In the case of routing on a line, the n nodes are along a path $P_n$. The set of routing paths for routing packets essentially consists of all subpaths of $P_n$, each subpath carrying packets between the two endpoints of the path. Thus, a packet between an arbitrary pair of nodes u, v on path $P_n$ follows a route along a subpath of $P_n$.

In the case of routing on a tree, the n nodes communicate only along edges of a tree T connecting the nodes. Thus, the set of routing paths consists of all the (unique) paths in the tree T between every pair of nodes in the tree T. Note that the above formulation for trees is more general than the VPN tree example discussed above. While the VPN tree example discussed above in conjunction with FIG. 1B only considered routing paths between the leaves of the tree (that is, VPN endpoints 1, 2, 3 and 4), the case of routing on a tree considers routing paths that consist of the (unique) paths in the tree between all pairs of nodes (that is paths between all the nodes chosen from (1, . . . , 12). Clearly, the restricted model in which the set of paths are restricted to only those that connect a subset of nodes in the tree (e.g., leaf nodes), has numerous practical applications that include implementation of multi-cast trees and VPNs. While the techniques of the present invention are applicable for general routing on a tree, they are also applicable to scenarios in which the set of paths is restricted to be only between specific endpoints, as would be apparent to a person of ordinary skill in the art.

Trade-off between Label Size and Stack Depth in MPLS Routing

A routing protocol for a line or a tree essentially specifies the actions performed by each node on the stacks of incoming packets such that for each path in the line or tree, packets between the endpoints traverse the path. Generally, a good routing protocol is one that uses the minimum possible set of labels (since this would enhance router performance), while pushing the minimum possible number of labels on the stack for each packet (since this would keep the packet sizes small). Unfortunately, there is a trade-off involved here, and the two goals of minimizing label sizes and minimizing stack depths are conflicting, as discussed above in conjunction with FIG. 1B. With a stack depth of two, four labels, one per VPN endpoint, were needed to route packets between the leaves of the tree. However, with a stack depth of two, only two labels were required.

There are two natural problems that can be formulated based on this interplay between the label size L and the maximum stack depth s. In a fixed stack routing problem, a bound on the depth allowed for the stack is provided, and a routing protocol must be identified that minimizes the number of labels L used.

In a fixed label routing problem, the dual problem of fixed stack routing, a fixed set of L labels is provided, and a routing protocol must be identified that minimizes the maximum stack depth s. See, Anupam Gupta et al., "Traveling with a Pez Dispenser (Or, Routing Issues in MPLS)," IEEE Foundations of Computer Science 2001: 148-157 (2001), incorporated by reference herein. Generally, the fixed label protocols for routing on a path $P_n$ uses L labels requiring only a stack depth $O(\log_L n)$, which is within a constant factor of the information theoretic bound.

In any graph G, if the stack depth is bounded by one, n labels are needed, otherwise, the n nodes of the graph cannot be distinguished. An extension of this is that if the stack depth is s, at least $L \geq n^{1/s}$ labels are needed; and that a label set of size L requires a stack depth of log n/log L. This is referred to as the information theoretic bound. In some cases, it can be shown that the information theoretic bound is provably weak, and that no routing protocol can achieve these trade-offs (the information theoretic bound just ensures enough space to encode the destination of the packet; it does not account for the extremely restricted way in which information encoded in the stack is accessed).

The nature of this restricted form of access is, however, reflected in the next lower bound: If the graph is a tree T, the number of labels is at least $\Delta$-1, where $\Delta$ is the maximum degree of a vertex in T. Indeed, let v be a vertex of degree $\Delta$, then a packet reaching v with a non-empty stack must decide which edge to go out on, and there are $\Delta$-1 possibilities.

As previously indicated, an (L, s) protocol is one that uses O(L) labels, and has a maximum stack depth O(s). The present invention provides a novel fixed stack routing protocol for routing on a line with a maximum stack depth of s that uses only $sn^{1/s}$ labels, which is quite close to the information theoretic bound of $n^{1/s}$.

For trees, the information theoretic bound can be very weak. Specifically, for a stack depth of two, as many as $\Omega(n^{2/3})$ labels may be required for a tree with $\Delta=n^{1/3}$, whereas the information theoretic bound is only $\Omega(n^{1/2})$ labels. Two solutions are proposed. First, a protocol is disclosed that, given a target stack depth s, uses only $O(\Delta+sn^{1/s})$ labels but violates the bound on the stack depth by a factor of two. On the other hand, if the bound on the stack depth cannot be violated, it is possible to route on a tree with $\Delta sn^{1/s}$ labels.

The disclosed fixed stack routing protocol, together with the fixed label routing protocol, serve as building blocks for arbitrary trees and are used in conjunction with a variant of the caterpillar decomposition (Nathan Linial et al., "Trees and Euclidean Metrics," Proc. of the 30th Annual ACM Symposium on Theory of Computing, 169-77 (1998); J. Matousek, "On Embedding Trees Into Uniformly Convex Banach Spaces," Israel Journal of Mathematics, 114:221-237 (1999)) of trees into paths to get a ($\Delta+L$; ($\log^2 n/\log L$) ) routing protocol. It is again noted that if the maximum degree of a tree is $\Delta$, then at least $\Delta$-1 labels are required. Note that the latter protocol can give a stack depth $O(\log^2 n/\log \log n)$ with $\Delta+O(\log n)$ labels. This protocol is improved to get a ($\Delta+\log \log n$; log n) protocol as well.

Fixed Stack Routing

The fixed stack routing protocols disclosed herein route packets on a line or a tree when there is an upper bound on the stack depth s. The objective is to minimize the number of labels used for this routing.

n-Vertex path $P_n$

Figure 4:
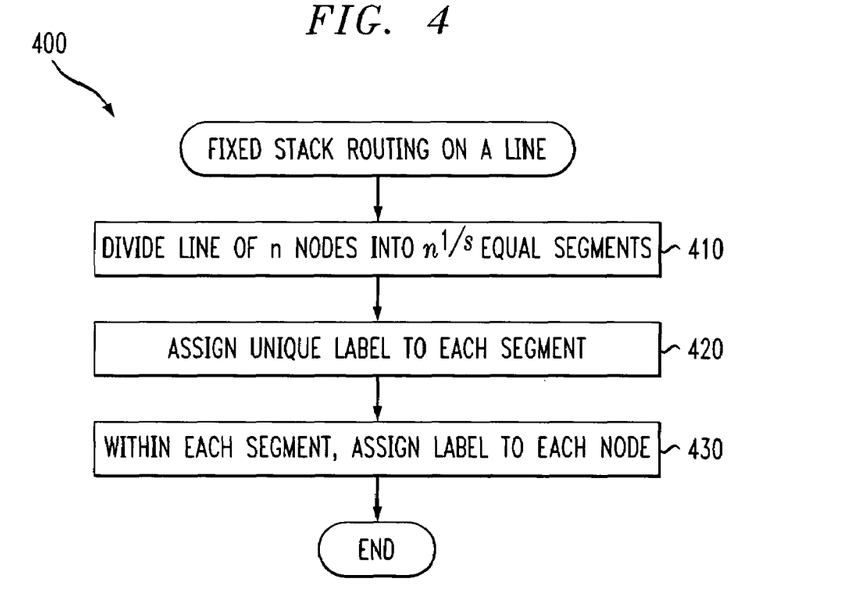
FIG. 4 is a flow chart describing an exemplary implementation of a fixed stack routing process for a line in accordance with the present invention.
Figure 5:
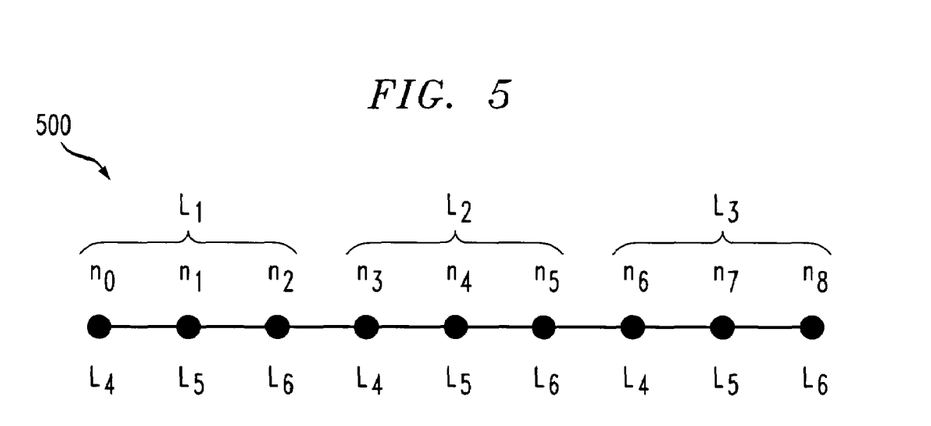
FIG. 5 illustrates an exemplary path of n vertices for which the fixed stack routing process of FIG. 4 can provide a routing protocol.

FIG. 4 is a flow chart describing an exemplary implementation of a fixed stack routing process 400 for a line in accordance with the present invention. FIG. 5 illustrates the special case where all the n vertices lie on a single path, referred to as nodes $n_0, n_1, n_2, \ldots n_{(n-1)}$, from left to right. There is a lower bound of $n^{1/s}$ on the number of labels, since the stack (of depth s) should be able to encode n distinct addresses. As an upper bound, given a bound of s on the maximum stack depth, the fixed stack routing process 400 uses at most $sn^{1/s}$ labels. In this protocol, each label consists of a tuple $\{i, p\}$. Here, i is a number between 1 and $n^{1/s}$, and p is a position between 1 and s. Using these labels, a stack depth of up to s can be used to encode any number smaller than n: look at its representation in base $\{n^{1/s}\}$, and for each non-zero digit, the label corresponding to the tuple {value of the digit, position from the right} is pushed. If the stack is created so that the positions increase from top to bottom, decrement operations are performed by popping the top label and (potentially) pushing some labels on top of the stack.

For example, if n equals 256 and s equals 4, the encoding of 178 is 2302, the representation of 178 in base $4=(256)^{1/4}$. The corresponding stack is $\{(2, 4), (3, 3), (2, 1)\}$, where $(2, 1)$ is the label at the top. To decrement this stack, the top is popped, and the label $(1, 1)$ is pushed onto the stack, which now corresponds to $(2301)_4=177$. Now, if a vertex i wants to send a packet to a vertex j to, for example, its right, vertex i encodes j-i-1 on the stack as above, and sends the packet to its neighbor to the right. (Note that since j is to the right of i, j>i and hence the value (j-i-1) is between 0 and n-1). When a vertex receives a packet that has a non-empty stack, the vertex decrements the value as described above. The vertex j will get the packet with an empty stack, and hence accept it.

Thus, the stack is effectively used as a counter that is decremented at each hop in the end-to-end path along a line. The last node knows it is the destination node because the stack is empty (i.e., the counter is zero).

As shown in FIG. 4, the fixed stack routing process 400 initially divides a line of n nodes into $n^{1/s}$ equal segments during step 410. Thereafter, a unique label is assigned to each segment during step 420. Finally, within each segment, a label is assigned to each node during step 430.

The fixed stack routing process 400 is further illustrated in conjunction with FIG. 5, where a path of n nodes (n equal to 9) is first divided into $n^{1/s}$ (i.e., three) equal segments. Thereafter, a unique label is assigned to each segment. For example, label $L_1$ is assigned to nodes $n_0$, $n_1$ and $n_2$; label $L_2$ is assigned to nodes $n_3$, $n_4$ and $n_5$; and label $L_3$ is assigned to nodes $n_6$, $n_7$ and $n_8$ in the example of FIG. 5. Finally, within each segment, one of $n^{1/s}$ (i.e., three) labels, $L_4, L_5, L_6$, is assigned to each node.

When the stack depth, s, is equal to two, a first stack level identifies one of the path segments and a second stack level identifies a node within the identified path segment.

Routing on Trees

Figure 6:
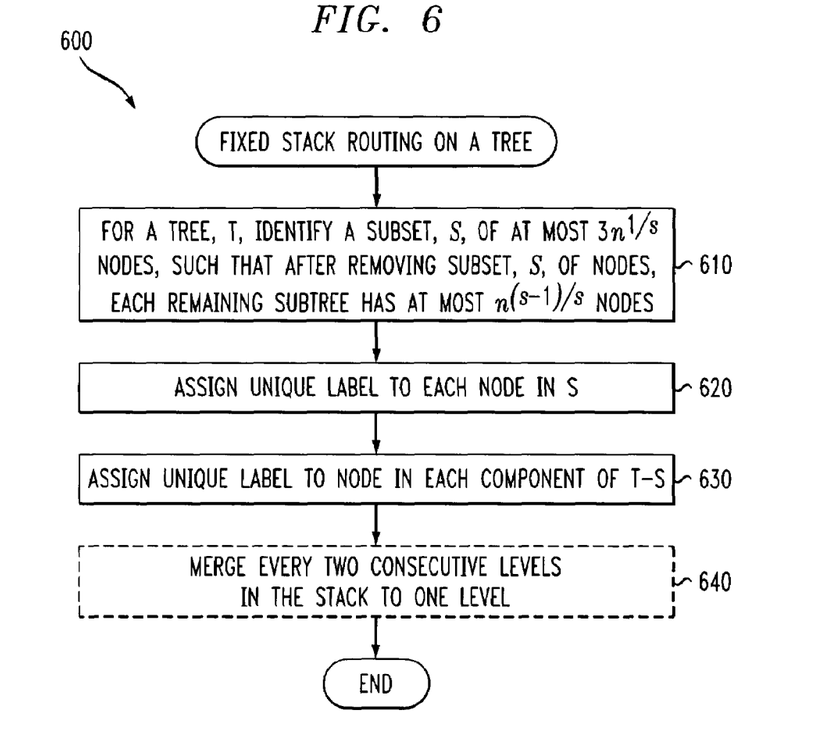
FIG. 6 is a flow chart describing an exemplary implementation of a fixed stack routing process for a tree in accordance with the present invention.
Figure 7:
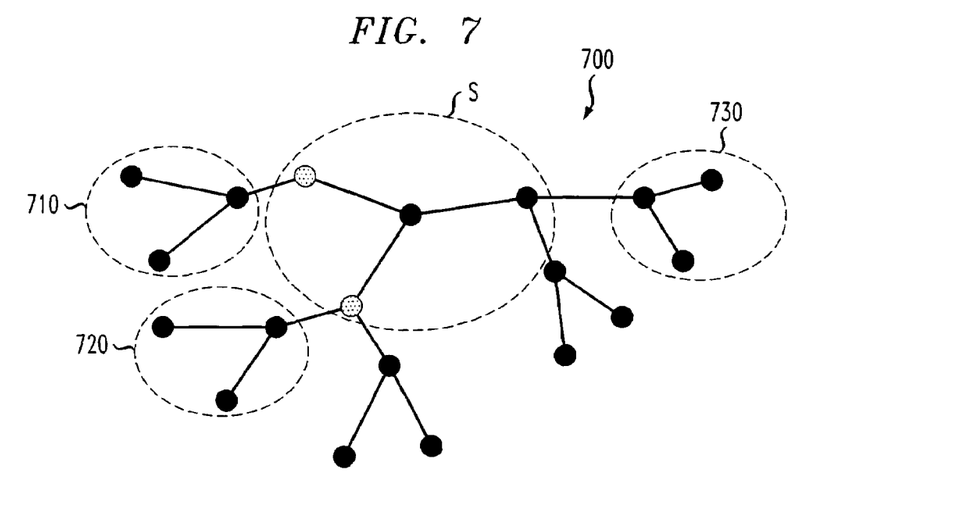
FIG. 7 illustrates an exemplary tree of n nodes for which the fixed stack routing process of FIG. 6 can provide a routing protocol.

FIG. 6 is a flow chart describing an exemplary implementation of a fixed stack routing process 600 for a tree in accordance with the present invention. FIG. 7 illustrates an exemplary tree, T, of nodes. The fixed stack routing process 600 provides two techniques for designing a protocol for routing on a tree, given a target stack depth, s. First, a protocol is provided that, given a target stack depth s, uses only $O(\Delta+sn^{1/s})$ labels (but violates the bound on the stack depth by a factor of two). If the bound on the stack depth cannot be violated, however, the fixed stack routing process 600 can provide a protocol to route on a tree with $\Delta sn^{1/s}$ labels. When the stack depth is bounded by two, for example, the fixed stack routing process 600 can provide a routing protocol that requires up to $\Omega(n^{2/3})$ labels.

Lower Bound

The information theoretic bound of $O(n^{1/2})$ is very weak for the case when the stack depth is bounded by two, and is in fact off by a polynomial factor. There are trees on n vertices for which the minimum number of labels required with stack depth two is $\Omega(n^{2/3})$ labels. Thus, a result like $\Delta+sn^{1/s}$, as obtained for the path, is not possible.

Upper Bounds

The crucial fact at the heart of the positive results is that for any tree T and any set S of vertices in T, there is a separator vertex v such that deleting v breaks T into several parts, none of these connected subtrees containing more than |S|/2 vertices from A. Recursively finding these separator vertices in these subtrees, the following can be proved: for any tree T, a subset S with n vertices in T, there is a subset A of at most 3 $n^{1/s}$ vertices of T whose deletion causes each connected subtree to have at most $n^{(s-1)/s}$ vertices of S.

It has been found that given any tree T, a subset S of n vertices in T, and a value s, there is a protocol to send messages to vertices in S that uses a stack depth at most (2 s-1) and $\Delta+3 \operatorname{sn}^{1/s}$ labels. In addition, given a tree T with n vertices, and maximum degree $\Delta$ of a vertex in T, it is possible to achieve stack depth s with $\Delta \operatorname{sn}^{1/s}$ labels.

As shown in FIG. 6, the fixed stack routing process 600 initially identifies a subset, S, of at most $3 \operatorname{n}^{1/s}$ nodes from the tree T, during step 610, such that after the subset, S, of nodes is removed, each remaining subtree has at most $n^{(s-1)/s}$ nodes. Thereafter, a unique label is assigned to each of the nodes in the subset S during step 620 and within each remaining subtree, one of up to $n^{(s-1)/s}$ labels is assigned to each node during step 630. Finally, if the bound, s, on the stack depth cannot be violated, then every two consecutive levels in the stack are merged to one level during step 640.

The fixed stack routing process 600 is further illustrated in conjunction with FIG. 7, where a subset, S, of at most $3 \operatorname{n}^{1/s}$ nodes from a tree 700, is identified, such that after the subset, S, of nodes is removed from the tree 700, each remaining subtree, such as subtrees 710, 720, 730, has at most $n^{(s-1)/s}$ nodes. Thereafter, a unique label is assigned to each of the nodes in the subset S and within each remaining subtree, such as subtrees 710, 720, 730, one of up to $n^{(s-1)/s}$ labels is assigned to each node. If the bound, s, on the stack depth cannot be violated, then every two consecutive levels in the stack are merged to one level.

When a packet is routed, the stack is first processed to identify a node v in the subset, S, using the unique label. Thereafter, an edge incident with node v is identified leading to the appropriate subtree, and a node within the subtree associated with the edge is identified based on one of up to $n^{(s-1)/s}$ labels. When the stack depth, s, is equal to three, for example, a first stack level identifies a node v in the subset, S, a second stack level identifies an edge incident with node v to take and a third stack level identifies a node with the corresponding subtree.

Figure 8:
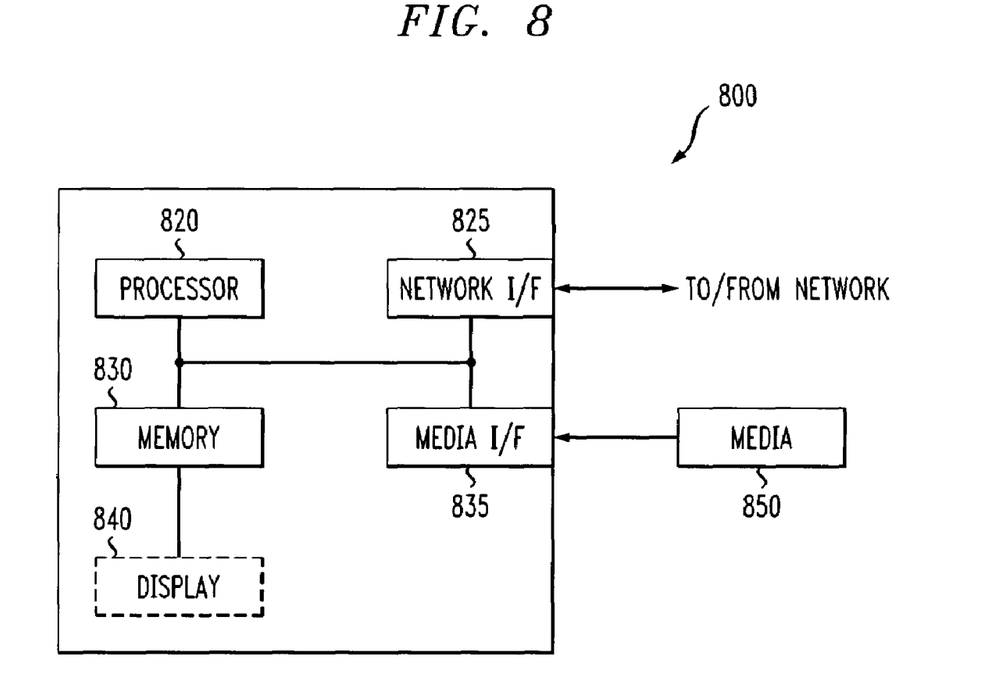
FIG. 8 is a schematic block diagram of a computing device that may be employed by a routing protocol designer to implement the techniques of FIG. 4 or 6.

FIG. 8 is a block diagram illustrating an exemplary computing device 800 that may be employed by a routing protocol designer to implement the techniques of the present invention. As shown in FIG. 8, the computing device 800 optionally interacts with a media 850, such as a Digital Versatile Disk (DVD). The exemplary computing device 800 comprises a processor 820, a network interface 825, a memory 830, a media interface 835, and an optional display 840. Network interface 825 allows the computing device 800 to connect to one or more wired or wireless networks (not shown), while media interfaces 835 allows the computing device 800 to interact with media such as a hard drive or DVD 850.

As is known in the art, the methods and apparatus discussed herein may be distributed as an article of manufacture that itself comprises a computer-readable medium having computer-readable code means embodied thereon. The computer-readable program code means is operable, in conjunction with a computer system such as computer system 810, to carry out all or some of the steps to perform the methods or create the apparatuses discussed herein. The computer-readable medium may be a recordable medium (e.g., floppy disks, hard drives, optical disks such as DVD 850, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as DVD 850.

Memory 830 configures the processor 820 to implement the methods, steps, and functions disclosed herein. The memory 830 could be distributed or local and the processor 820 could be distributed or singular. The memory 830 could be implemented as an electrical, magnetic or optical memory, or any combination of these or other types of storage devices. Moreover, the term "memory" should be construed broadly enough to encompass any information able to be read from or written to an address in the addressable space accessed by processor 810. With this definition, information on a network, accessible through network interface 825, is still within memory 830 because the processor 820 can retrieve the information from the network. It should be noted that each distributed processor that makes up processor 820 generally contains its own addressable memory space. It should also be noted that some or all of computer system 810 could be incorporated into an application-specific or general-use integrated circuit. Optional video display 840 is any type of video display suitable for interacting with a human user of computing device 800. Generally, video display 840 is a computer monitor or other similar video display.

The computing device 800 can be configured to implement the fixed stack routing processes 400, 600, discussed above in conjunction with FIGS. 4 and 6, respectively, in a known manner.

The disclosed fixed stack routing protocol enables routing on large trees with few labels and small stack sizes. For instance, the fixed stack routing protocol can route on a tree containing 1000 nodes with only 70 labels and a stack of depth three. Clearly, these savings in labels for a single tree have the potential to translate into fairly substantial reductions in label consumption when thousands of such trees are provisioned by service providers (e.g., for MPLS-based VPNs).

It is to be understood that the embodiments and variations shown and described herein are merely illustrative of the principles of this invention and that various modifications may be implemented.

We claim:

1. A method for routing a packet within a plurality of n nodes arranged in a line using a stack depth, s, wherein said line of said plurality of n nodes are divided into segments, a first unique label is assigned to each of said segments; and within each of said segments, a second unique label is assigned to each node, wherein s is an integer that is not less than one, said method comprising the steps of:

identifying one of said segments based on said first unique label; and identifying a node within said identified segment based on said second unique label, wherein said n nodes are divided into approximately $n^{1/s}$ segments.

2. The method of claim 1, wherein each of said segments includes an approximately equal number of nodes.

3. The method of claim 1, wherein within each of said segments, one of up to $n^{1/s}$ of said second unique labels are assigned to each node.

4. The method of claim 1, wherein said first and second unique labels employ up to $2 n^{1/s}$ labels.

5. The method of claim 1, wherein said stack depth, s, is equal to two, and wherein a first stack level identifies one of said segments and a second stack level identifies a node within said identified segment.

6. A method for routing a packet within a plurality of n nodes arranged in a tree, T, using a stack depth, s, wherein a subset, S, of said nodes is identified in said tree, such that after removing said subset, S, of said nodes from said tree, each remaining subtree as less than a maximum number of said nodes; and wherein a first unique label is assigned to each of said nodes in S, and within each of said subtrees, a second unique label is assigned to each node, wherein s is an integer that is not less than one, said method comprising the steps of:

identifying a node v in said subset, S, using said first unique label;

identifying an edge incident with node v; and identifying a node within a subtree associated with said edge based on said second unique label, wherein said n nodes are divided into approximately $n^{1/s}$ segments.

7. The method of claim 6, wherein said subset, S, has up to $3\,n^{1/s}$ nodes.

8. The method of claim 6, wherein said maximum number of nodes is $n^{(s-1)/s}$ and within each of said subtrees, one of up to $n^{(s-1)/s}$ labels are assigned to each node, wherein s is an integer that is not less than one.

9. The method of claim 6, wherein said first and second labels employ a stack depth of 2 s-1 and $\Delta+sn^{1/s}$ labels and where $\Delta$ is a maximum degree of a vertex.

10. The method of claim 6, wherein said stack depth, s, is equal to three, a first stack level identifies said node v in said subset, S, a second stack level identifies said edge incident with said node v to take and a third stack level identifies a node with a corresponding subtree.

11. The method of claim 6, further comprising the step of merging every two consecutive levels in said stack to one level.

12. The method of claim 11, wherein a protocol employs a stack depth of s and $\Delta sn^{1/s}$ labels and where $\Delta$ is a maximum degree of a vertex.

13. A system for routing a packet within a plurality of n nodes arranged in a line using a stack depth, s, wherein said line of said plurality of n nodes are divided into segments, a first unique label is assigned to each of said segments; and within each of said segments, a second unique label is assigned to each node, wherein s is an integer that is not less than one, said system comprising:

a memory; and at least one processor, coupled to the memory, operative to:

identify one of said segments based on said first unique label; and         identify a node within said identified segment based on said second unique label, wherein said n nodes are divided into approximately $n^{1/s}$ segments.

14. The system of claim 13, wherein each of said segments includes an approximately equal number of nodes.

15. The system of claim 13, wherein within each of said segments, one of up to $n^{1/s}$ of said second unique labels are assigned to each node.

16. A system for routing a packet within a plurality of n nodes arranged in a tree, T, wing a stack depth, s, wherein a subset, S, of said nodes is identified in said tree, such that after removing said subset, S, of said nodes from said tree, each remaining subtree has less than a maximum number of nodes; and wherein a first unique label is assigned to each of said nodes in S, and within each of said subtrees, a second unique labels is assigned to each node, wherein s is an integer that is not less than one, said system comprising:

a memory; and at least one processor, coupled to the memory, operative to:

identify a node v in said subset, S, using said first unique label;

identify an edge incident with node v; and         identify a node within a subtree associated with said edge based on said second unique label, wherein said n nodes are divided into approximately $n^{1/s}$ segments.

17. The system of claim 16, wherein said subset, S, has up to $3\,n^{1/s}$ nodes.

18. The system of claim 16, wherein said maximum number of nodes is $n^{(s-1)/s}$ and within each of said subtrees, one of up to $n^{(s-1)/s}$ labels are assigned to each node, wherein s is an integer that is not less than one.

\* \* \* \* \*

UNITED STATES PATENT AND TRADEMARK OFFICE
CERTIFICATE OF CORRECTION

| | | |
|---|---|---|
| PATENT NO. | : 7,542,470 B2 | Page 1 of 1 |
| APPLICATION NO. | : 10/404010 | |
| DATED | : June 2, 2009 | |
| INVENTOR(S) | : Anupam Gupta | |

It is certified that error appears in the above-identified patent and that said Letters Patent is hereby corrected as shown below:

In claim 3, column 10, line 55, "$n^{1,s}$" should be replaced by --$n^{1/s}$--.

Signed and Sealed this
Twenty-ninth Day of January, 2013

David J. Kappos
*Director of the United States Patent and Trademark Office*